May 31, 1927.
F. F. LANDIS
SHOCK ABSORBER
Filed Oct. 7, 1924
1,631,039
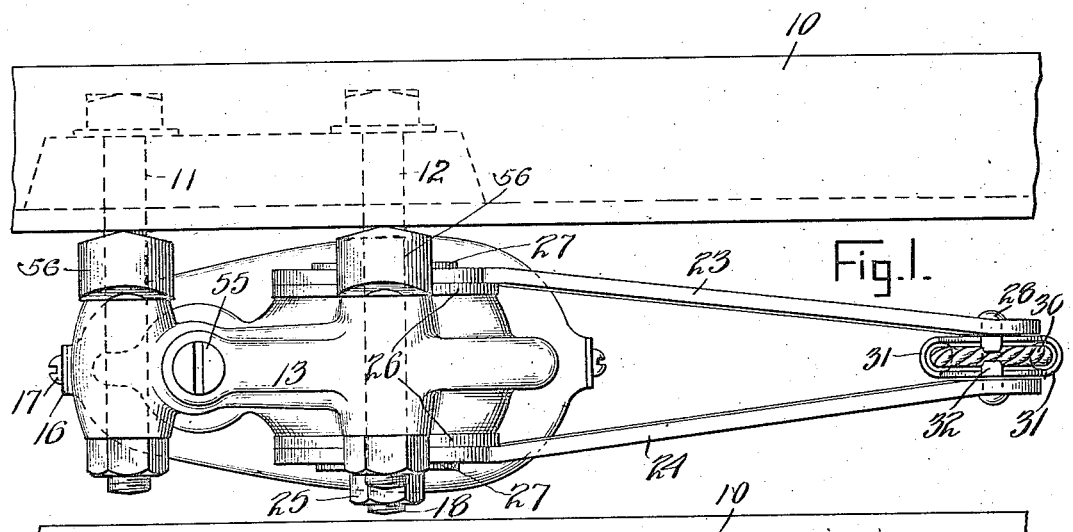
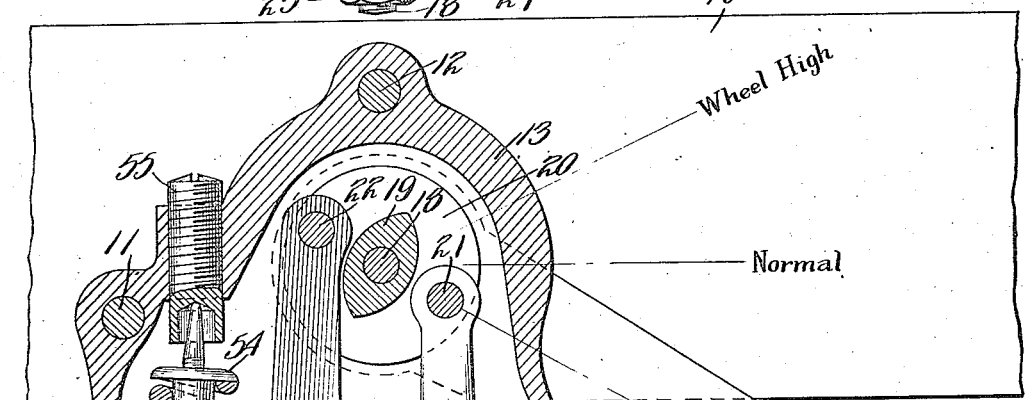
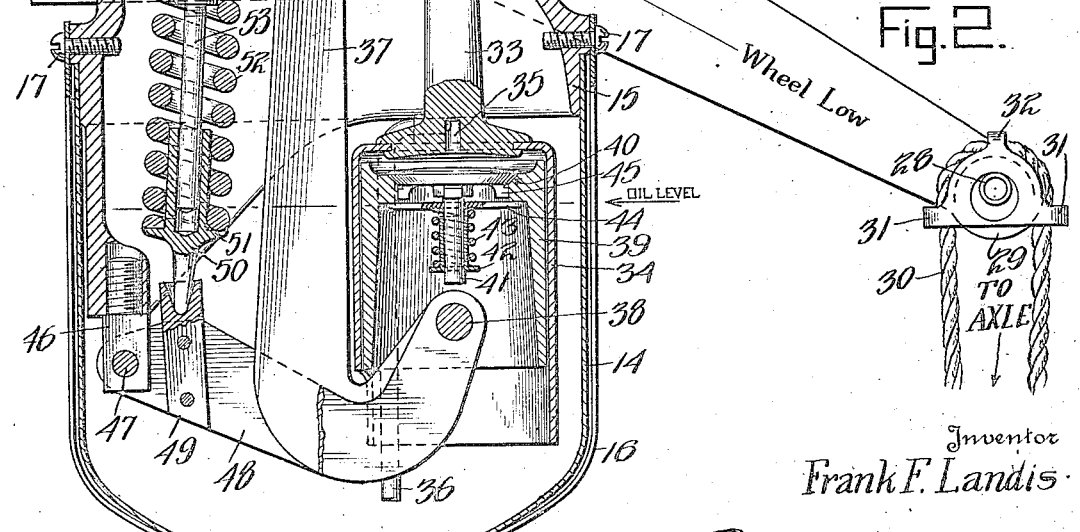
Inventor
Frank F. Landis Patented May 31, 1927.

1,631,039

UNITED STATES PATENT OFFICE.

FRANK F. LANDIS, OF WAYNESBORO, PENNSYLVANIA.

SHOCK ABSORBER.

Application filed October 7, 1924. Serial No. 742,248.

My said invention relates to a hydraulic shock diffuser for vehicles and it is an object thereof to provide a device of this character containing fluid protected against the action of air so as to prevent foaming, which commonly occurs in shock absorbers of this character and which causes the diffuser to lose in efficiency due to loss of fluid.

Another object is to provide a device of this character in which the parts shall be readily demountable for inspection and repairs.

Another object of the invention is to provide a device of this character in which noise shall be eliminated to an unusual degree.

Referring to the accompanying drawings, which are made a part hereof and on which similar reference characters indicate similar parts, Figure 1 is a plan, and Figure 2, a vertical section on line 2—2 of Fig. 1.

In the drawings reference character 10 indicates a member of the vehicle frame to which the shock diffuser is attached by means of anchor bolts 11 and 12. The anchor bolts are so located relatively to the housing and its contained parts as to be readily applicable to almost any of the various constructions found between the running gear and the body of an automobile. The shock diffuser comprises a casing including a housing 13 having an open lower end and a tank or receptacle 14 for holding liquids (usually oil) fitting at its upper end about a flange 15 on the housing 13. The oil receptacle is held in place by means of a bail 16 extending under the same midway of its sides and secured to the housing by a pair of screws 17.

At the upper end of the casing there is a pivot 18 bearing a body 19 having the general form of a cylinder and having an integral pair of flanges 20 one at each end of the body. A pair of pins 21 and 22 extend through the flanges and said pins form means for connecting a pair of levers 23 and 24 to the flanges 20 to move therewith, the body 19 and the flanges providing a journal for the said levers. In the present embodiment of my invention the pivot 18 is in the form of a bolt passing through the casting which includes flanges 20 and body 19. The bolt also passes through the circular butt ends of twin levers 23 and 24, the head of the bolt and the nut 25 on the bolt serving to secure said parts rigidly together. The end of the pins 21 and 22 are flush with the outer surfaces of the levers 23 and 24 and serve to unite the flanged casting rigidly to the levers to move therewith on the pivot 18.

The flanged casting may be made of bronze or brass for convenience in machining and if so will have its end covered by caps indicated at 26 held in place by the levers 23 and 24. The pins are prevented from longitudinal displacement by means of washers 27. At their free end the levers are connected by a pin 28, a pulley 29 being interposed between them over which a cable 30 passes. The pulley has guides 31, 31 and 32 for the cable which is secured directly or indirectly to one of the springs supporting the body of the vehicle as by attachment to an axle or other element of the running gear or any unsprung part of the vehicle.

The pin 21 serves as a pivotal support for a rod 33 supporting at its lower end an inverted cylinder 34. A passage 35 extends up into the rod 33 and then downward through a conduit 36 to a point below the lower end of the cylinder. The other pin 22 supports pivotally a bent connecting rod 37 pivoted at 38 to a piston 39 in the shape of a hollow cylinder having a passage through its upper end. The passage at the upper end of the cylinder is closed by a valve 40 having a stem 41 surrounded by a flanged sleeve 42 held in place by a cotter pin or the like. The sleeve supports a coiled spring 43 which rests at its upper end against a flat bar 44 through which the stem 41 extends. The spring thus serves to draw the valve 40 down on its seat causing it to close more promptly than by its own gravity. The valve is held in central position by downwardly extending fingers 45 bearing at their ends against the inner surface of the hollow piston.

The cylinder and piston just described are situated near one end of the tank 14 and low enough so that the oil in the tank always seals the cylinder. Preferably the oil level is kept near the upper end of the cylinder as illustrated in Figure 2. Near the opposite end of the tank or in any convenient location a plug 46 has threaded engagement with a depending portion of the casing 14, the plug being apertured to receive the pivot 47 of a pair of levers 48 pivoted at the other end concentrically with the connecting rod 37 on the piston pin 38.

A block 49 forms a bridge between the twin levers rigidly securing the two to each other and said block has a depression at its upper end in which is supported for universal movement the lower end—which may be approximately spherical—of a socket member 50 which has a collar 51 forming a support for one end of a helical spring 52. A rod 53 extends through the helical spring into the socket said rod having a collar 54 supporting the other end of the spring, the collar being threaded on the rod. The rounded upper end of the rod is pivotally supported in a depression formed in a threaded plug 55 situated in a threaded hole in the casing 13 and adjustable to vary the tension of the spring.

In the operation of my device the levers 23 and 24 will move upward relative to casing 13 about the pivot 18 when the wheel, on the road, strikes a ridge or other cause of road shock causing spring compression. The levers 23 and 24 move upward relative to the housing 13 to move cylinder 34 upward and piston 39 downward producing a void in cylinder 34 during all auto spring compression movements, be they short or long. This void is instantly filled by a free flow of oil, or other liquid, through the large valve 40 in upper end of piston 39. This valve is instantly closed at, or before, the start of auto spring recoil by the light tension of spring 43 the torsion of which is about equal to the gravity of valve 40 causing it to close upon its seat in upper end of piston 39 more promptly than it will close by its own gravity, therefore the oil or other liquid is trapped within cylinder 39 before the start of auto spring recoil, therefore a hydraulic resistance which is always in exact proportion to the speed of spring recoil is obtained through the restricted by-pass 35 and 36 and any leakage that may be around the outside of piston 39 and the inside of cylinder 34. The said resisted discharge from said cylinder is always violent, but being discharged downward and much below the oil level in the oil retainer 14 prevents all possibility of agitation of the top surface of oil level, preventing all possibility of forming or causing a froth on top surface, which would very quickly saturate the entire body of oil in retainer 14 and practically defeats a proper control of automobile spring recoils. Any device, for said purpose, that will produce sufficient agitation on the top surface of a liquid, to form or produce a froth, or frothing on said surface, will defeat a proper hydraulic control of automobile spring recoil.

To retain a constant bearing in all movable joints, (from the axle of the car, to the hydraulic resistance between the top end of piston 39 and the closed end of an inverted cylinder 34) in the direction they are during hydraulic resistance, to prevent rattling during automobile spring compressions when there is little or no pressure on said joint, in this construction, I provide a spring as 52 to hold all of the working joints in contact in the direction they hold during hydraulic resistance to auto spring recoil, which may be accomplished in various ways. In this form of my hydraulic shock diffuser, I employ a spring as 52 of such strength that will hold all joints in contact in the direction they are during automobile spring recoil, by a short range of distortion of spring 52 during the maximum movements of all moving details. The spring 52 is compressed by the adjusting screw 55 to a tension sufficient to hold the arms 23 and 24 to their limit of upward movement. In this construction the spring 52 exerts its force down upon lever 48 at a short distance from its fulcrum, the work end of lever 48 being pivoted to the joint connecting a hook link 37 to piston 39 said link being pivoted to the crank 22 in journal 19 to each end of which is clamped said lever 23 and 24 therefore the compression of spring 52 hold said levers up and all working joints in contact as they are during hydraulic resistance or during all recoil movements of the automobile spring. This construction eliminates all lost motion that may occur by loose fits of said joints, eliminating rattle and lost motion between the hydraulic resistance elements in cylinder 34 and the car axle, as any lost motion between the axle and the hydraulic resistance elements would permit the start of recoil before hydraulic resistance is established, which is exactly the result that follows, but to a much greater extent when air becomes mingled with the oil. The oil level is much above the open end of cylinder 34 so that at no time is it possible for air to enter the cylinder.

The loss of oil in hydraulic shock absorbers is due mainly to the frothing of the oil where it is mingled with air in the movement of the shock absorbing parts. The froth fills the oil chamber above the level of the oil and forces its way out through any small cracks or openings. Where, as in my device the air cannot mingle with the oil in the actual shock diffusing process no appreciable froth will be formed and the oil level will practically always be below the level of any joints or cracks between the parts, hence the loss of oil will be reduced to the smallest possible limits.

It should be noted that the flanges 20 are protected by annular flanges on the housing, and that the joints between these parts are covered by the caps 26 so as to exclude dust and grit here as well as at other points on the outer faces of said flanges.

It should also be noted that the action of spring 52 is approximately constant in all its positions. This is due to the fact that the lower end of socket member 50 is at all times higher than a line passing through the pivots at 47 and 38, and to the additional fact that the end of such socket member is rather close to pivot 47. When the levers 23 and 24 are moved down the end of the socket member moves on a short radius about pivot 47, and as the spring is compressed the operative length of the lever arm through which it reacts on said pivot (i. e. the power arm of the lever 48) decreases rapidly, hence the relative uniformity in the effect of the spring.

As a preferred means for connecting the cable 30 to the levers 23 and 24 I have shown the pulley 29 as having an axial opening of much larger diameter than that of the pin or rivet on which it is journaled, thus providing for a rolling contact between the inner surface of the pulley and the journal (or a sleeve on the journal) whereby friction is greatly reduced as compared with a structure in which the pulley fits closely on its journal. This is particularly important during the recoil of the vehicle springs at which time the levers 23 and 24 are pulled down violently by the cable, with heavy friction on the parts above referred to.

The housing 13 is spaced from the frame member to which it is secured by bolts 11 and 12, by means of spacers 56 on said bolts. Each spacer has a line contact with the housing, e. g. along a horizontal line, and a line contact with the frame member at right angles to the other line, i. e. along a vertical line, though the specific location of the lines may be varied to suit particular conditions. The tension on the bolts being very heavy is liable to distort the housing or the frame member in the absence of some such compensating means as is supplied by the spacers 56.

It will be obvious to those skilled in the art that my device may be modified in various ways without departing from the spirit of the invention and therefore I do not limit myself to what is shown in the drawings and described in the specification but only as indicated in the appended claims.

Having thus fully described my said invention what I claim as new and desire to secure by Letters Patent is:

1. In a hydraulic shock diffuser, a container for liquid, an inverted cylinder open at the bottom end only sealed by the liquid, a piston in the cylinder, and means for moving the cylinder and piston relatively to each other while keeping the interior of the cylinder free of air, substantially as set forth.

2. In a hydraulic shock diffuser, a container for a body of liquid supported in fixed position on a vehicle frame, a cylinder opening below the surface of the liquid, a piston in the cylinder, and means for moving the cylinder and the piston each relatively to the container in response to the recoil from road-shocks without access of air to the interior of the cylinder, substantially as set forth.

3. In a hydraulic shock diffuser, a container for a body of liquid adapted to be supported in fixed position on a vehicle frame, a cylinder sealed at its lower end by the liquid, said cylinder being otherwise imperforate a piston in the cylinder, and means for moving the cylinder and the piston relatively to each other in response to the recoil of a vehicle spring, substantially as set forth.

4. In a hydraulic shock diffuser, a container for a body of liquid adapted to be supported in fixed position on a vehicle frame, an inverted cylinder sealed by the liquid, said cylinder being open at its bottom end only a piston in the cylinder, and means for moving the cylinder and the piston relatively to each other in response to the recoil of a vehicle spring, substantially as set forth.

5. In a shock diffuser for vehicles, a container for fluid adapted to be attached to a vehicle body, oppositely movable members therein, a horizontal journal at the upper end of the device, levers fixed to the journal at opposite sides with their common fulcrum at the axis of said journal, and connections from the free ends of the levers to an unsprung part of the vehicle whereby the same shock diffuser may be connected interchangeably adjacent any wheel of a vehicle, substantially as set forth.

6. In a hydraulic shock diffuser, a container for fluid adapted to be attached to a vehicle body, oppositely movable members in the container, a lever pivoted on the shock diffuser, alined oppositely movable members hinged to the lever at opposite sides of the pivot of the lever, and connections from the free end of the lever to an unsprung part of the vehicle, substantially as set forth.

7. In a hydraulic shock diffuser for vehicles, a receptacle for a body of liquid, a cylinder open only beneath the level of the liquid, a piston in the cylinder said piston having a longitudinal passage, a valve closing the passage during the recoil movement of the adjacent vehicle spring, and means for moving the cylinder downward during such recoil movement substantially as set forth.

8. In a hydraulic shock diffuser for spring-supported vehicles, a receptacle for a body of liquid, a cylinder open only beneath the level of the liquid, a piston in the cylinder said piston having a longitudinal passage, a valve closing the passage during the recoil movement of the adjacent vehicle spring, and a spring biasing the valve toward closed position, substantially as set forth.

9. In a hydraulic shock diffuser for spring-supported vehicles, a receptacle for a body of liquid, a cylinder open only beneath the level of the liquid, a piston in the cylinder said piston having a longitudinal passage, a valve closing the passage during the recoil movement of the adjacent vehicle spring, and a by-pass leading from the cylinder to a point below the level of the body of liquid, substantially as set forth.

10. In a hydraulic shock diffuser for spring-supported vehicles, a receptacle for a body of liquid, a cylinder open only at the lower end beneath the level of the liquid, a piston movable relatively to the cylinder said piston having a longitudinal passage, a valve closing the passage during the recoil movement of the adjacent vehicle spring, and connections from the running gear of the vehicle to one of said relatively movable elements, substantially as set forth.

11. In a hydraulic shock diffuser, a housing, a pair of levers at opposite sides of the housing pivotally mounted in the upper part of the same said levers being joined at their ends remote from the housing, a flexible connection from the joined ends of the levers down to an unsprung part of the vehicle, and a pair of anchor bolts located respectively above the housing and at the side remote from the joined ends of said levers for securing the housing to the vehicle body, substantially as set forth.

12. In a shock diffuser, a housing, a bolt passing through the housing, a journal pivotally mounted on the bolt, a loose pin extending through the journal parallel to the axis thereof, a lever held in place on the journal by said bolt and pin, and a movable shock-diffusing element journaled on said pin, substantially as set forth.

13. In a shock diffuser, a housing, a bolt passing through the housing, a journal pivotally mounted on the bolt said journal having flanges at opposite sides, a loose pin extending through the flanges parallel to the axis thereof a lever held in place on the journal by said bolt and pin, and a movable shock-diffusing element journaled on said pin, substantially as set forth.

14. In a shock diffuser, a housing adapted to be connected to one of two relatively movable elements, a bolt extending transversely thereof, a journal on the bolt, one or more levers removably secured to the bolt externally of the housing, connections from said levers for attaching them to the other of said movable members, and removable means securing the levers to the journal, substantially as set forth.

15. In a shock diffuser, a housing adapted to be connected to one of two relatively movable elements, a bolt extending transversely thereof, a journal on the bolt, one or more levers removably secured to the bolt externally of the housing, connections from said levers for attaching them to the other of said movable members, and removable means for securing the levers to the journal said means being equally spaced from the axis of the journal at opposite sides thereof, substantially as set forth.

16. In a hydraulic shock diffuser, a housing, a bolt extending transversely thereof for attachment to the vehicle body, a journal on the bolt, one or more levers removably secured to the journal externally of the housing, connections from said levers adapted to be attached to an unsprung part of a vehicle, removable means securing the levers to the journal, and relatively movable shock-diffusing elements also connected to said means, substantially as set forth.

17. In a hydraulic shock diffuser for vehicles, a tank containing a body of liquid, a bolt extending transversely thereof, a journal on the bolt, one or more levers removably secured to the journal externally of the housing, connections from said levers adapted to be attached to an unsprung part of the vehicle, removable pins equally spaced from the axis of the journal at opposite sides thereof, and a cylinder and piston being supported by the respective pins, substantially as set forth.

18. In a hydraulic shock diffuser, a tank containing a body of liquid, a bolt extending transversely thereof, a journal on the bolt, one or more levers removably secured to the bolt externally of the housing, means for connecting said levers to an unsprung part of a vehicle, removable pins equally spaced from the axis of the journal at opposite sides thereof, a cylinder depending from one of said pins and being sealed by the liquid, a piston in the cylinder, a connecting rod from the other pin to the piston, a lever pivoted at one end to the casing and at the other to the piston pin, and a spring acting on said lever to take up wear in the connections from the cylinder and piston to said levers, substantially as set forth.

19. In a shock diffuser, a housing, a bolt extending transversely thereof, a journal on the bolt, one or more levers removably secured to the bolt externally of the housing, connections from said levers to an unsprung part of a vehicle, removable pins equally spaced from the axis of the journal at opposite sides thereof, a cylinder and a piston journaled on said pins, a spring in the casing, and connections from the spring to compensate for wear in the connections from the cylinder and piston to the levers, substantially as set forth.

20. In a hydraulic shock diffuser, a tank containing a body of liquid, a bolt extending transversely thereof, a journal on the bolt, one or more levers removably secured to the bolt externally of the housing, connections from said levers to an unsprung part of a vehicle, removable pins spaced from the axis of the journal at opposite sides thereof, a cylinder depending from one of said pins and being sealed by the liquid, a piston in the cylinder, a connecting rod from the other pin to the piston, a lever pivoted at one end to the casing and at the other to the piston pin, a spring in said casing acting on said lever to take up wear in the connections from the cylinder and piston to said levers, and means accessible from the exterior of the casing for adjusting the tension of the spring, substantially as set forth.

21. In a hydraulic shock diffuser, a tank containing a body of liquid, a bolt extending transversely thereof, a journal on the bolt, one or more levers removably secured to the bolt externally of the housing, connections from said levers to an unsprung part of a vehicle, removable pins equally spaced from the axis of the journal at opposite sides thereof, a cylinder depending from one of said pins and being sealed by the liquid, a piston in the cylinder, a connecting rod from the other pin to the piston, a lever pivoted at one end to the casing and at the other to the piston pin, a spring in said casing acting on said lever to take up wear in the connections from the cylinder and piston to said levers, and a screw plug extending through said casing for adjusting the tension of the spring, substantially as set forth.

22. In a hydraulic shock diffuser, a casing adapted to contain a body of liquid, a journal fitting in openings in the wall of the casing, caps fitting over the ends of the journal, levers resting against the caps, pins extending through said journals caps and levers, a bolt also extending through said parts, means on said bolt for holding the pins in place, and connections from said pins to relatively movable shock diffusing members, substantially as set forth.

23. In a hydraulic shock diffuser, a casing adapted to contain a body of liquid, a journal fitting in openings in the wall of the casing with flanges thereabout concentric with said journal, caps at the ends of the journal fitting about said flanges, levers resting against the caps, pins extending through said journals caps and levers, a bolt also extending through said parts, means on said bolt for holding the pins in place, and connections from said pins to relatively movable shock diffusing members, substantially as set forth.

24. In a shock diffuser, a casing adapted to be secured to one of two relatively movable parts, a movable shock diffusing element therein, means for connecting said element to the other of said relatively movable parts, and resilient means whereby a constant pressure is maintained on the connections between all of said parts, substantially as set forth.

25. In a shock diffuser, a casing adapted to be secured to one of two relatively movable parts, a lever pivoted on the casing said lever adapted to be connected to the other of said movable parts, two movable shock diffusing elements in the casing connected to the lever at opposite sides of its pivot, and resilient means whereby a constant pressure is maintained on the connections between all of said parts, substantially as set forth.

26. In a shock diffuser, a casing adapted to be secured to one of two relatively movable parts, a movable shock diffusing element therein, means for connecting said element to the other of said relatively movable parts, a lever pivoted to the casing and to the movable shock diffusing element, and a spring arranged to exert approximately constant tension on the lever in all its positions, substantially as set forth.

27. In a shock diffuser, a casing adapted to be secured to one of two relatively movable parts, a lever pivoted on the casing said lever adapted to be connected to the other of said movable parts, two movable shock diffusing elements in the casing connected to the lever at opposite sides of its pivot, a lever in the casing connected to one of said shock diffusing elements, and resilient means acting on said lever to prevent lost motion between the parts due to movement of the first-named lever, substantially as set forth.

28. In a shock diffuser, a housing for connection to one of two relatively movable parts said housing being open at the bottom, a tank having at its upper end a sliding fit with the housing, and a bail pivoted to the housing said bail extending underneath the tank to hold it in place, substantially as set forth.

29. In a shock diffuser, a housing for connection to one of two relatively movable parts said housing being open at the bottom, a laterally flattened tank having at its upper end a sliding fit with the housing, and a bail pivoted to the housing said bail extending lengthwise underneath the tank to hold it in place, substantially as set forth.

30. In a shock diffuser, a casing adapted to be secured to one of two relatively movable parts, movable shock diffusing means therein, connections from said means to the other of said relatively movable parts including a lever, a pivot at one end thereof, a guide-pulley on the pivot having a journal-opening much larger than the diameter of the pivot, and a cord passing over the pulley, substantially as set forth.

31. In a shock diffuser, a casing adapted to be secured to one of two relatively movable parts, movable shock diffusing means therein, connections from said means to the other of said relatively movable parts including twin levers, a pivot at one end thereof between the twin lever members, a guide-pulley on the pivot having a journal-opening much larger than the diameter of the pivot, and a cord passing over the pulley, substantially as set forth.

32. In a shock diffuser, a housing, a lever pivoted thereon, means to connect the free end of the lever to an unsprung part of the vehicle, movable shock-diffusing means connected to the lever adjacent said pivot, a pair of bolts located respectively above the pivot and at the side remote from the free end of the lever, and spacers between the housing and the body of the vehicle each spacer having line contacts on opposite faces at right angles to each other with the housing and said body respectively, substantially as set forth.

33. In a shock diffuser, a housing for attachment to a vehicle body, bolts connecting said parts, and spacers having line contacts on opposite faces with said body and said housing said line contacts being at right angles to each other, substantially as set forth.

34. In a shock diffuser for spring vehicles, a casing on the vehicle body containing a body of liquid, one or more levers pivoted on the casing and connected at their free ends to an unsprung part of the vehicle, a cylindrical casing sealed by the liquid, a piston in the cylinder, means connecting the piston to said levers including a piston pin and a connecting rod, a lever pivoted to the piston pin and to said casing, and a spring acting on the last-named lever to prevent noise in the connections between said parts, substantially as set forth.

35. In a shock diffuser for spring vehicles, a casing on the vehicle body containing a body of liquid, one or more levers pivoted on the casing and connected at their free ends to an unsprung part of the vehicle, a cylindrical casing sealed by the liquid, a piston in the cylinder, means connecting the piston to said levers including a piston pin and a connecting rod, twin levers pivoted to the casing and to the piston pin at opposite sides of the connecting rod, a block between said levers having a depression at one side, a spring support pivoted at one end in said depression, means on the casing forming a pivotal support for the other end of the spring support, and a spring on the support acting through the twin levers to compensate for wear in the connections between the above-named movable parts, substantially as set forth.

36. In a shock diffuser for automobiles, the combination of a hollow housing having bearings located in opposite walls thereof, a reciprocating cylinder journaled in said bearings, one or more cranks between said journals oscillating with said cylinder said housing having uniform vertical sides making it Janus-faced whereby it may be secured to either the right or the left side of an automobile frame, substantially as set forth.

37. In a shock diffuser for automobiles, a Janus-faced housing arranged to be secured to an automobile frame, a cylindrical block having journals at its ends, an oscillating crank on the block between said journals, a shock-diffusing element pivotally connected to said crank, and levers secured to opposite ends of said cylindrical block, substantially as set forth.

38. In a shock diffuser for automobiles, a housing provided with twin bearings said housing adapted to be attached to the frame of an automobile, an oscillatory cylinder having twin journals in said bearings, twin cranks on said cylinder, shock diffusing elements connected to said cranks, twin levers secured to the ends of said journals, and means for attaching said levers to an unsprung part of an automobile, substantially as set forth.

39. In a hydraulic shock diffuser for automobiles, a housing forming a base for attachment to an automobile frame, a quickly-detachable liquid retainer coacting with said housing to form a chamber, and shock diffusing means in said chamber, substantially as set forth.

40. In a hydraulic shock diffuser for automobiles, a Janus-faced housing, shock-diffusing devices supported thereby, means at both sides of the housing for operating said shock diffusing devices, and connections therefrom to an unsprung part of an automobile, substantially as set forth.

41. In a hydraulic shock diffuser, a cylinder open at the bottom and otherwise imperforate, a piston, an intake valve on the piston, a hook-shaped link pivotally secured at one end to the piston, and means connected to the other end of the link for actuating it to operate said piston, substantially as set forth.

42. In a hydraulic shock diffuser for automobiles, an inverted cylinder pivoted at its upper end, a reciprocating piston within said cylinder, means for moving one of said elements relatively to the other, and a free intake valve on the piston, substantially as set forth.

43. In a hydraulic shock diffuser for automobiles, a housing forming a base for attachment to an automobile frame, a liquid retainer fitting closely about the lower part of the housing and coacting therewith to form a chamber, shock absorbing means in said chamber, and a bail pivotally supported on the housing said bail engaging underneath the retainer for holding it in place, substantially as set forth.

In witness whereof, I have hereunto set my hand at Waynesboro, Pennsylvania, this thirtieth day of September, A. D. nineteen hundred and twenty-four.

FRANK F. LANDIS.